United States Patent
Tocker

(10) Patent No.: US 8,344,947 B2
(45) Date of Patent: Jan. 1, 2013

(54) MULTIPATH MITIGATION IN POSITIONING SYSTEMS

(75) Inventor: Moshe Tocker, Tel Aviv (IL)

(73) Assignee: Cellguide Ltd., Rehovot (IL)

(*) Notice: Subject to any disclaimer, the term of this patent is extended or adjusted under 35 U.S.C. 154(b) by 137 days.

(21) Appl. No.: 12/881,209

(22) Filed: Sep. 14, 2010

(65) Prior Publication Data

US 2012/0062426 A1    Mar. 15, 2012

(51) Int. Cl.
*G01S 19/22*   (2006.01)
*G01S 3/02*   (2006.01)
(52) U.S. Cl. .................. 342/357.61; 342/464
(58) Field of Classification Search ............. 342/357.25, 342/357.61, 453, 457, 463–465; 455/63.1, 455/114.2, 296
See application file for complete search history.

(56) References Cited

U.S. PATENT DOCUMENTS 6,727,846 B1* 4/2004 Brown .................. 342/357.63
2003/0223517 A1* 12/2003 Fimoff et al. ............ 375/346

* cited by examiner

*Primary Examiner* — Dao Phan
(74) *Attorney, Agent, or Firm* — Mark M Friedman

(57) ABSTRACT

The location of a receiver is determined by receiving respective ranging signals from each of a plurality of transmitters at known locations. The ranging signals are cross-correlated with respective model signals to provide respective cross-correlation functions. For cross correlation functions that are determined to include multipath noise, the multipath noise is estimated and removed. Respective delays of the cross-correlation functions are estimated and the location of the receiver is inferred from the delays.

17 Claims, 5 Drawing Sheets

MULTIPATH MITIGATION IN POSITIONING SYSTEMS

FIELD AND BACKGROUND OF THE INVENTION

The present invention relates to positioning systems such as Global Navigation Satellite Systems (GNSS) and, more particularly, to a method of mitigating multipath noise in such systems.

A GNSS system is a space-based global navigation system in which the satellites of a constellation of satellites in orbit around the Earth transmit signals that are used by terrestrial receivers for purposes such as navigation. The existing GNSS systems include the GPS system operated by the United States of America and the GLONASS system operated by Russia. The present invention is described herein in terms of the GPS system. It will be clear to those skilled in the art how to use the principles of the present invention in the context of other GNSS systems such as the forthcoming European Galileo system or the forthcoming Chinese Compass navigation system.

The GPS system includes between 24 and 32 satellites in medium Earth orbit. The GPS ranging code that is available for public use is the C/A code which is a PseudoRandom binary Code (PRN) of 1,023 bits. Each satellite continuously transmits, as its ranging signal, sequences of its own unique PRN code that is orthogonal to all the other PRN codes. Modulated on top of each satellite's C/A code is a navigation message that includes an ephemeris (plural: ephemerides) that describes the satellite's orbit. The ephemerides are updated every two hours.

A GPS receiver generates its own copies of the C/A codes, nominally synchronized with the satellite transmissions. When the receiver receives the C/A codes of the currently visible satellites (typically 12-16 satellites in open terrain), the receiver cross-correlates its copies of the C/A code with the received C/A codes to determine the one-way travel times from the satellites to the receiver. Knowing the ephemerides, the receiver computes the locations of the satellites at the times of the transmissions to obtain ranges to the satellites. If the receiver's clock were perfectly synchronized with the satellites then signals from three satellites would suffice to triangulate the location (horizontal coordinates x and y and elevation z) of the receiver. Because clocks that could be synchronized that well with the atomic clocks used by the satellites are far too expensive for routine use, signals from four or more satellites are used to determine x, y, z and the time offset dt of the receiver's clock from the GPS clocks. If only the horizontal coordinates are needed for navigation then signals from three satellites suffice.

Dense urban environments present some of the hardest challenges for GNSS receivers. The characteristics of these environments, also known as "urban canyons", generate two negative effects on GNSS receiver performance:

Line of sight blockage between a transmitting satellite and the GNSS receiver due to high buildings decreasing the number of visible satellites.
  Erroneous measurements (multipath errors) caused by satellite transmissions that are reflected from adjacent buildings and received by the GNSS receiver.

It would be highly advantageous to have a GNSS receiver that is more resistant to multipath noise than presently known GNSS receivers.

SUMMARY OF THE INVENTION

The method of the present invention is based on an algorithm for mitigating multipath effects in a GNSS receiver. A receiver using this algorithm benefits from improved measurement accuracy, leading to better positioning and navigation performance in multipath-prone environments.

The algorithm is an optimal echo delay estimation method using a combination of a high-resolution multipath mitigation technique with a peak estimation technique. It has been found that using the multipath mitigation technique for non-multipath scenarios yields results that are less good than a peak estimation technique for non-multipath scenarios. Therefore, according to the present invention, the multipath mitigation technique is activated based on a quality threshold mechanism that has been calibrated to ensure optimal results in both multipath and non-multipath scenarios.

The quality estimation mechanism is used to determine the probability that a multipath effect is present in the current sample being processed. Based on this probability, a system of the present invention uses either a multipath mitigation technique or a peak estimation technique for non-multipath scenarios.

The multipath mitigation technique approach allows multipath discrimination with a resolution that is better than the resolution of the measurements performed by the GNSS receiver. The method enables high-resolution discrimination by matching multipath effects using templates with a resolution that is higher than the original measurement resolution.

Therefore, according to the present invention there is provided a method of determining a location of a receiver, including the steps of: (a) using the receiver, receiving, from each of a plurality of transmitters at known locations, a respective ranging signal; and (b) for each ranging signal: (i) cross-correlating the each ranging signal with a respective model signal thereby obtaining a respective cross-correlation function, (ii) determining whether the respective cross-correlation function includes multipath noise, and (iii) if the respective cross-correlation function includes multipath noise: (A) estimating the multipath noise, and (B) removing the multipath noise from the respective cross-correlation function.

Furthermore, according to the present invention there is provided a device for determining a location at which a plurality of ranging signals are received from a plurality of transmitters at known respective locations, including: (a) a receiver for receiving the ranging signals; (b) at least one cross-correlator for cross-correlating each ranging signal with a respective model signal, thereby obtaining, for each ranging signal, a corresponding cross-correlation function; and (c) a multipath mitigation unit for, for each cross-correlation function: (i) determining whether the each cross-correlation function includes multipath noise, and (ii) if the each cross-correlation function includes multipath noise: (A) estimating the multipath noise, and (B) removing the multipath noise from the corresponding cross-correlation function.

Furthermore, according to the present invention there is provided A computer-readable storage medium having embodied thereon computer-readable code for mitigating multipath noise in a cross-correlation function obtained by cross-correlating a ranging signal with a model signal, the computer-readable code including: (a) program code for determining whether the cross-correlation function includes multipath noise; and (b) program code for, if the cross-correlation function includes multipath noise: (i) estimating the multipath noise; and (ii) removing the multipath noise from the cross-correlation function.

According to the basic method of the present invention, for determining the location of a receiver, the receiver is used to receive, from each of a plurality of transmitters at known locations, a respective ranging signal. The locations are known but not necessarily fixed as functions of time. Indeed, in the primary intended application of the method, the transmitters are satellites of a GNSS system, but note that the method is clearly applicable to positioning systems other than GNSS systems. Each ranging signal is cross-correlated with a respective model signal, thereby obtaining a respective cross-correlation function. For each cross-correlation function, it is determined whether the cross-correlation function includes multipath noise. If the cross-correlation function does in fact include multipath noise, the multipath noise is estimated and removed.

Preferably, the model signals are respective ranging codes of the various transmitters. For example, if the transmitters are GPS satellites, the model signals are the respective C/A codes of the satellites.

Preferably, to determine whether a ranging signal includes multipath noise, a template function is generated from the respective cross-correlation function of the ranging signal. A quality measure is computed for the cross-correlation function by comparing the template function to the cross-correlation function. Then the quality measure is compared to a predetermined threshold. Preferably, the template function has a predetermined shape, most preferably a triangular shape. The template function is generated by fitting the predetermined shape to the cross-correlation function.

Preferably, the multipath noise is estimated using least squares estimation.

Preferably, estimated multipath noise is removed from a cross-correlation function that has been found to include multipath noise by subtracting the multipath noise from the cross-correlation function.

Preferably, for each ranging signal, a respective delay of the ranging signal's cross-correlation function is estimated, most preferably by fitting a predetermined functional form such as a parabolic function to the cross-correlation function. "Fitting" a shape or a functional form to a cross-correlation function means that the shape or functional form is parametrized by parameters with adjustable values, and the values that give the best match of the shape or functional form to the cross-correlation function are found.

Most preferably, with the delays having been estimated, the location of the receiver is inferred from the delays.

A basic device for implementing the method of the present invention includes a receiver for receiving the ranging signals, one or more cross correlators and a multipath mitigation unit. The cross-correlator(s) is/are for cross-correlating each ranging signal with the respective model signal. The multipath mitigation unit is for determining whether the resulting cross-correlation functions include multipath noise and for estimating and removing the multipath noise from the cross-correlation functions that have been determined to include multipath noise.

Preferably, the device also includes a delay estimation unit for estimating respective delays of cross-correlation functions after multipath noise has been removed from the cross-correlation functions that require such removal. Most preferably, the device also includes a navigation unit for inferring the location of the device from the delays.

The scope of the invention also includes a computer-readable storage medium having embodied thereon computer-readable code for implementing the method of the invention.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of multipath noise mitigation according to the present invention may be better understood with reference to the drawings and the accompanying description.

Figure 1:
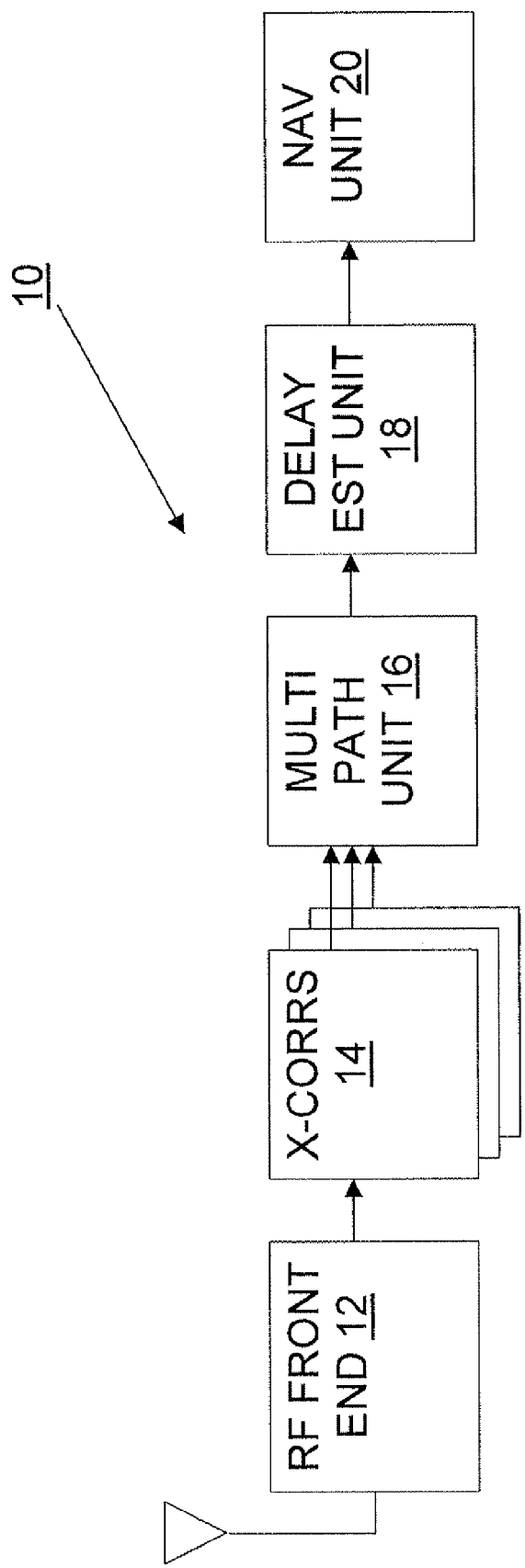
FIG. 1 is a high-level block diagram of a GPS receiver of the present invention.

Referring now to the drawings, FIG. 1 is a high-level block diagram of a GPS receiver 10 of the present invention. GPS receiver 10 includes a RF front end 12, a set of correlators 14, a multipath mitigation unit 16, a delay estimation unit 18 and a navigation unit 20. RF front end 12 receives and digitizes GPS ranging signals from the GPS satellite constellation. Each correlator 14 cross-correlates the ranging signals with a model signal that in the GPS case is the respective PRN code of one of the GPS satellites. In the absence of multipath noise, the delay of the peak of each cross-correlation would be a measure of the one-way travel time from the corresponding GPS satellite to UPS receiver 10. Multipath noise in the received ranging signals tends to shift the cross-correlation delays to later times. Therefore, the cross-correlations produced by correlators 14 are input to multipath mitigation unit 16 that estimates and removes multipath noise from the cross-correlations, as described below, before the cross-correlations are input to delay estimation unit 18 that estimates the delays of the cross-correlations. The estimated delays are input to navigation unit 20 that performs the actual navigation calculations to determine the location of GPS receiver 10.

The GPS system, like most GNSS systems, is a CDMA system, so that the signal received by RF front end 12 is a superposition of ranging signals from all the visible GPS satellites in the relevant frequency band (the L1 frequency band, centered at 1575.42 MHz, in the case of the publicly available C/A signals). The exceptional GNSS is GLONASS that is a FDMA system.

In principle, one correlator 14 suffices. The digitized ranging signals could be stored in a memory and cross-correlated sequentially with each relevant model signal. In practice, several correlators 14, as shown in FIG. 1, are used in order to save time by cross-correlating with the relevant model signals in parallel.

Correlators 14, multipath mitigation unit 16, delay estimation unit 18 and navigation unit 20 may be implemented in hardware, in firmware, in software or as any combination of the three. Usually, correlators 14 are implemented in hardware for speed.

Figure 2:
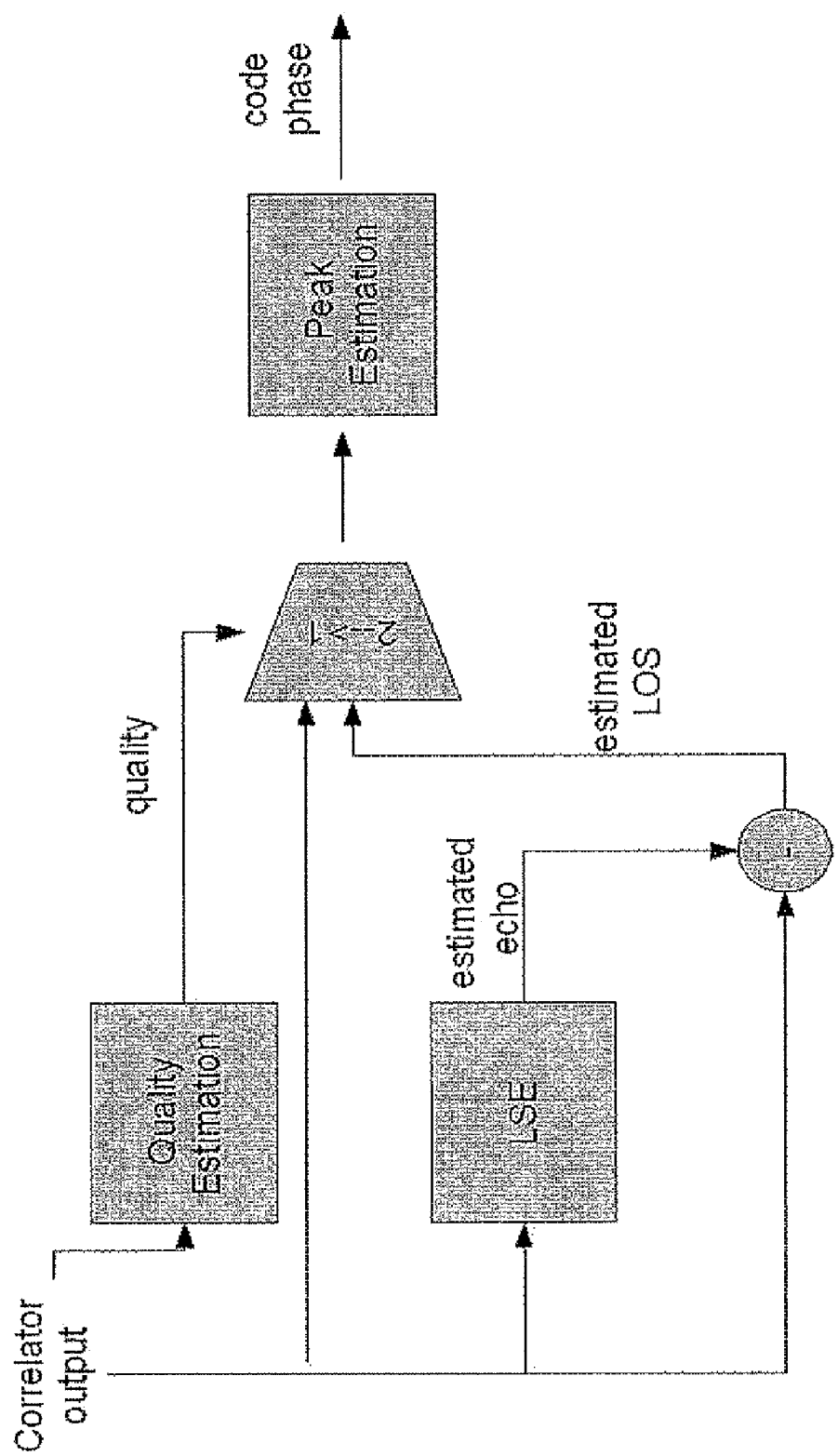
FIG. 2 is a block diagram of the computational flow of the algorithm of the present invention.

The multipath mitigation algorithm of the present invention is a combination of quality estimation using template generation and a least squares estimator for a two-ray signal model. The block diagram of FIG. 2 shows the computational flow of the algorithm.

The algorithm uses the template quality estimation to decide whether or not to activate the multipath mitigation technique. If the quality is less then a predefined threshold (smaller values means less probability for multipath scenario)

then peak estimation is performed over the signal cross-correlation itself. Otherwise Least Squares Estimation is performed over the signal cross-correlation. The echo cross-correlation is estimated and then is subtracted from the signal cross-correlation. The remaining estimated line-of-sight (LOS) correlation is inserted into the peak estimation block.

This approach yields optimal results for both line-of-sight and multipath scenarios.

Template quality estimation is a mechanism used to distinguish between LOS signals and LOS+multipath echoes. The template quality estimation mechanism generates a signal template, and then evaluates the difference between the signal template and the original correlation. The method requires normalization of the correlation pattern before evaluating the quality. The normalization is estimating the correlation peak (using lines intersection for example) and dividing the correlator output by this value.

Figure 3:
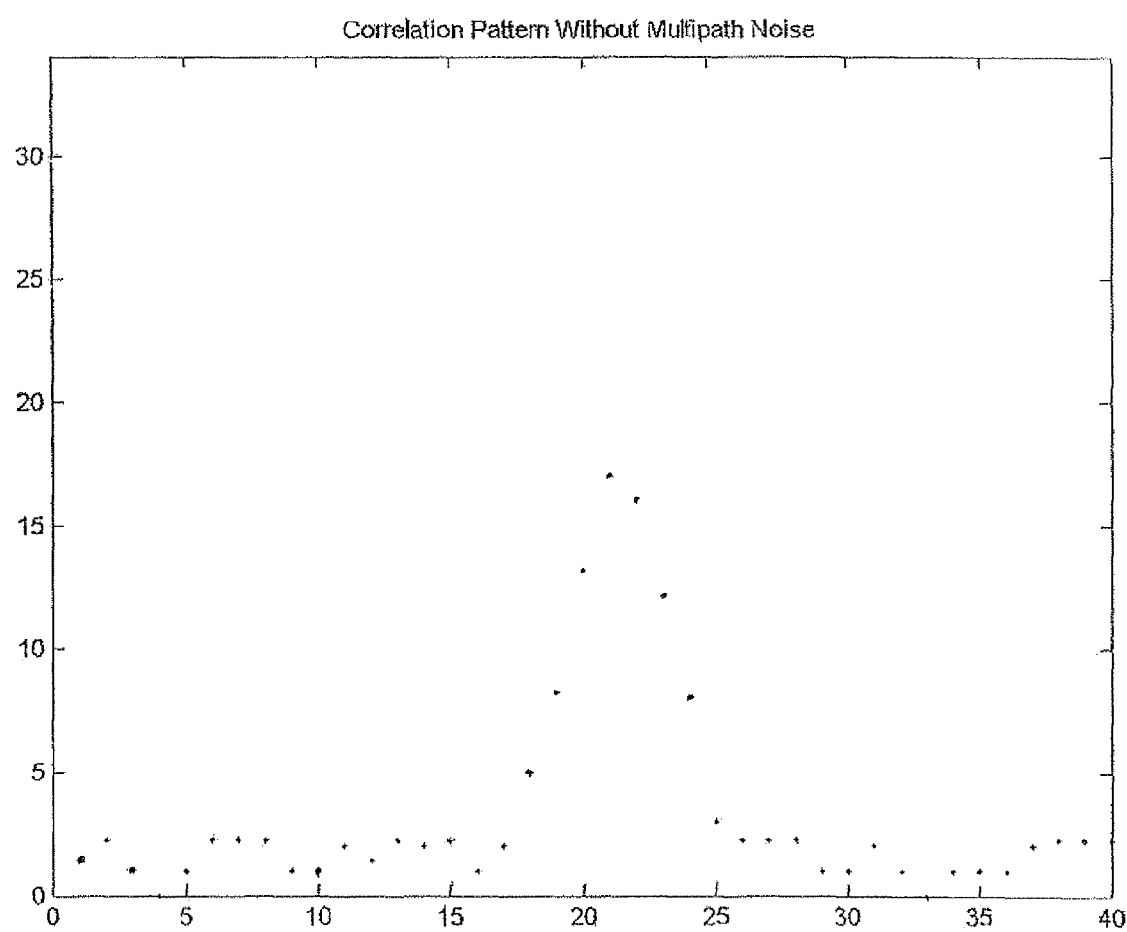
FIG. 3 shows a typical cross-correlation function in the absence of multipath noise.

FIG. 3 shows a typical cross-correlation function in the absence of multipath noise. The function is sampled discretely at equally spaced sampling times that are numbered by an index k along the horizontal axis of FIG. 3. The units of the function, on the vertical axis of FIG. 3, are arbitrary. The sampling interval $T_s$ in this case is one-quarter of the duration $T_c$ of a single CIA code chip. As can be seen in FIG. 3, in the absence of multipath noise, the cross-correlation function is triangular in the vicinity of the function's peak. Therefore, the preferred template is triangular. If the cross-correlation function is normalized to a peak value of 1, the slopes of the two sides of the triangle are $m=\pm T_s/T_c$.

Figure 4:
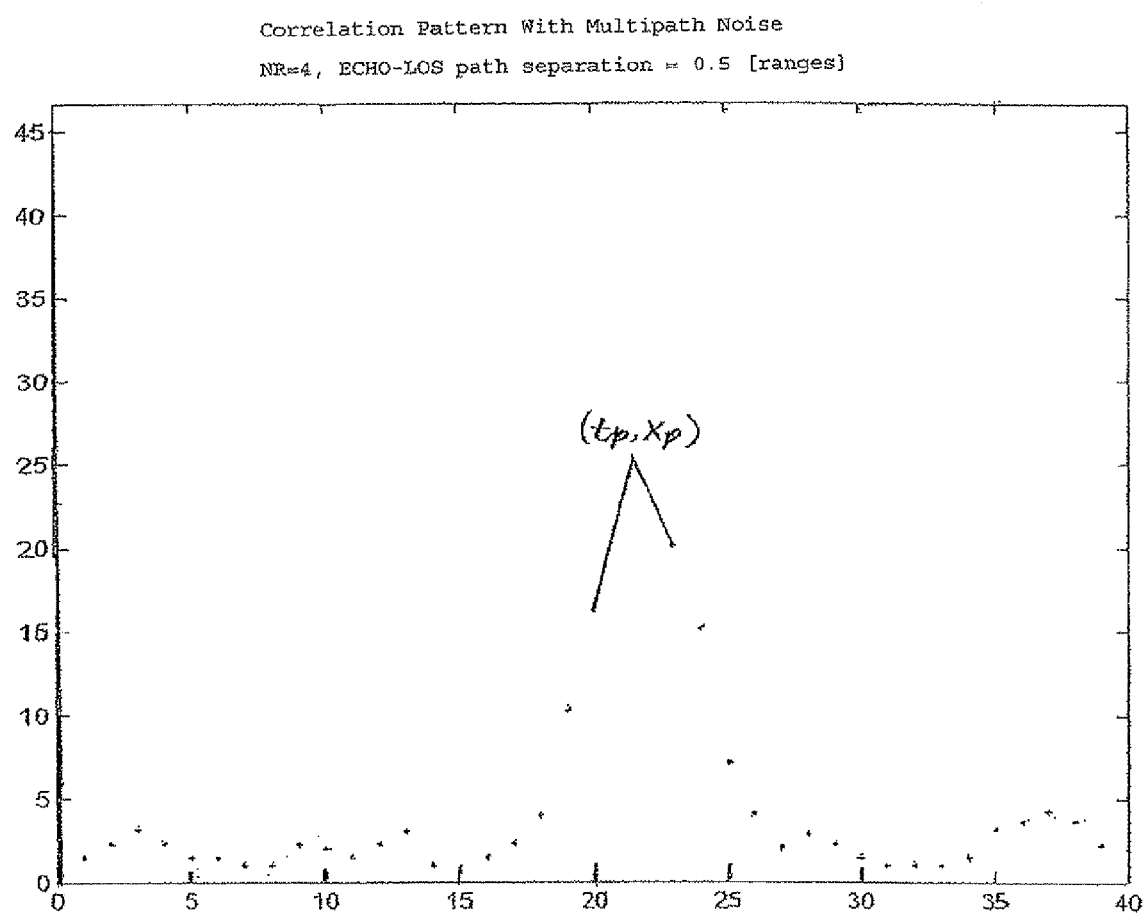
FIG. 4 shows a typical cross-correlation function in the presence of multipath noise.

FIG. 4 shows a typical cross-correlation function in the presence of multipath noise, along with the construction that is used to find the apex $(t_p, x_p)$ of an isosceles triangle that, after being normalized to a peak value of 1, is used as the template: straight lines are drawn through the two uppermost pairs of points of the cross-correlation function, as shown. The template is an isosceles triangle whose apex is at $(t_p, 1)$ and whose sides have the slopes $m=T_s/T_c$. This template is sampled at the sampling times of the cross-correlation function to obtain ideal normalized triangular correlation pattern values $x_{ideal}(k)$ at sampling indices k. The values of the cross-correlation function also are normalized by dividing by $x_p$ to obtain normalized samples $x_{sample}(k)$ at the sampling indices k. The quality measure is $$\zeta = \Sigma |x_{samples}(k) - x_{ideal}(k)|$$

where the summation is over the $2T_c/T_s$ samples, centered around the peak of the interpolated triangle, that are the samples that correspond to the main lobe of the cross-correlation function. The lower the value of $\zeta$, the more the normalized cross-correlation main lobe resembles the ideal triangle. The threshold value of $\zeta$ that distinguishes cross-correlation functions whose delays are shifted by multipath noise from cross-correlation functions whose delays are not significantly shifted by multipath noise is system-specific and can be obtained by those skilled in the art from simulations of multipath and non-multipath scenarios.

The least squares estimation is based on maximum likelihood estimation theory, assuming white Gaussian noise. The signal is modeled by:

$$A_1 e^{j\phi_1} R(t-\tau_1) + A_2 e^{j\phi_2} R(t-\tau_2)$$

where R is the auto-correlation function for the pseudo random code. The solution is obtained by solving a set of linear equations derived from the partial derivatives of the log maximum likelihood function according to each of the six parameters to be estimated $\theta = [A_1, \phi_1, \tau_1, A_2, \phi_2, \tau_2]^T$, under the constraint that $\tau_1 < \tau_2$. If it can be assumed that A1>A2, that condition provides an additional constraint to improve the quality of the solution.

After obtaining the estimated parameters the echo is subtracted from the received signal and peak estimation is performed.

The signal model for a single ray is given by $A_1 e^{j\phi_1} R(n-\tau_1)$. The function can be at higher resolution then the actual correlator output to allow better discrimination between the echo and the LOS signal.

For a given code delay $\tau_1$ we define a real function $T_1(n) = R(n-\tau_1)$ and try to minimize:

$$J(u) = \sum_{n=0}^{N-1} |x(n) - uT_1(n)|^2$$

$$= \sum_{n=0}^{N-1} (x(n) - uT_1(n))(x(n) - uT_1(n))^*$$

$$= \sum_{n=0}^{N-1} |x(n)|^2 - x(n)u^* T_1(n) -$$

$$uT_1(n)x^*(n) - uu^* T_1^2(n)$$

where $u = A_1 e^{j\phi_1}$.

The complex derivative is defined as:

$$\frac{\partial J}{\partial v} = \frac{1}{2}\left(\frac{\partial J}{\partial v_R} - j\frac{\partial J}{\partial v_I}\right)$$

and its properties are:

$$\frac{\partial v}{\partial v} = 1$$

$$\frac{\partial v^*}{\partial v} = 0$$

$$\frac{\partial vv^*}{\partial v} = v^*\frac{\partial v}{\partial v} + v\frac{\partial v^*}{\partial v} = v^* + 0 = v^*$$

Now let J be minimized by differentiating and equating to zero:

$$\frac{\partial J}{\partial u} = \sum_{n=0}^{N-1} \frac{\partial J}{\partial u}(|x(n)|^2 - x(n)u^* T_1(n) - uT_1(n)x^*(n) - uu^* T_1^2(n)) = 0$$

$$\sum_{n=0}^{N-1} 0 - 0 - T_1(n)x^*(n) - u^* T_1^2(n) = 0$$

$$u^* \sum_{n=0}^{N-1} T_1^2(n) = \sum_{n=0}^{N-1} T_1(n)x^*(n)$$

$$\rightarrow u = \frac{\sum_{n=0}^{N-1} T_1(n)x(n)}{\sum_{n=0}^{N-1} T_1^2(n)}$$

We now extend the above derivation to two rays. The model is given by $A_1 e^{j\phi_1} R(n-\tau_1) + A_2 e^{j\phi_2} R(n-\tau_2)$. The minimization is performed over:

$$J(u,v) = \sum_{n=0}^{N-1} |x(n) - uT_1(n) - vT_2(n)|^2 =$$

-continued $$\sum_{n=0}^{N-1}(x(n)-uT_1(n)-vT_2(n))(x(n)-uT_1(n)-vT_2(n))^* =$$

$$\sum_{n=0}^{N-1}(x(n)-uT_1(n)-vT_2(n))(x^*(n)-u^*T_1(n)-v^*T_2(n)) = \sum_{n=0}^{N-1}|x(n)|^2 -$$

$$x(n)u^*T_1(n) - x(n)v^*T_2(n) - uT_1(n)x^*(n) + uT_1^2(n)u^* +$$

$$uT_1(n)v^*T_2(n) - vT_2(n)x^*(n) + vT_2(n)u^*T_1(n) + vT_2^2(n)v^* =$$

$$\sum_{n=0}^{N-1}|x(n)|^2 - u^*\gamma_x(\tau_1) - v^*\gamma_x(\tau_2) - u\gamma_x^*(\tau_1) + |u|^2\gamma(0) +$$

$$uv^*\gamma(\tau_1-\tau_2) - v\gamma_x^*(\tau_2) + u^*v\gamma(\tau_1-\tau_2) + |v|^2\gamma(0) =$$

$$\sum_{n=0}^{N-1}|x(n)|^2 - (u^*\gamma_x(\tau_1) + u\gamma_x^*(\tau_1)) - (v^*\gamma_x(\tau_2) + v\gamma_x^*(\tau_2))$$

$$(|u|^2+|v|^2)\gamma(0) + \gamma(\tau_1-\tau_2)(uv^* + u^*v)$$

where $T_2(n)=R(n-\tau_2)$. We use the identity $$uv^*+u^*v=2(Re\{u\}Re\{v\}+Im\{u\}Im\{v\})\equiv f(u,v))$$

which implies $$J(u,v) = \sum_{n=0}^{N-1}|x(n)|^2 - f(u,\gamma_x(\tau_1)) -$$

$$f(v,\gamma_x(\tau_2)) + (|u|^2+|v|^2)\gamma(0) + \gamma(\tau_1-\tau_2)f(u,v)$$

We now differentiate and equate to zero:

$$\frac{\partial J(u,v)}{\partial u} = \sum_{n=0}^{N-1} -T_1(n)x^*(n) + T_1^2(n)u^* + T_1(n)v^*T_2(n) = 0$$

$$\frac{\partial J(u,v)}{\partial v} = \sum_{n=0}^{N-1} -T_2(n)x^*(n) + T_2^2(n)v^* + T_1(n)u^*T_2(n) = 0$$

This can be rewritten in matrix form:

$$A \cdot [u^* v^*]^T = b$$

where $$A = \begin{bmatrix} \sum_{n=0}^{N-1}T_1^2(n) & \sum_{n=0}^{N-1}T_1(n)T_2(n) \\ \sum_{n=0}^{N-1}T_1(n)T_2(n) & \sum_{n=0}^{N-1}T_2^2(n) \end{bmatrix}, b = \begin{bmatrix} \sum_{n=0}^{N-1}T_1(n)x^*(n) \\ \sum_{n=0}^{N-1}T_2(n)x^*(n) \end{bmatrix}$$

A also can be written as:

$$A = \begin{bmatrix} \gamma(0) & \gamma(\tau_1-\tau_2) \\ \gamma(\tau_1-\tau_2) & \gamma(0) \end{bmatrix}, b = \begin{bmatrix} \gamma_x(\tau_1) \\ \gamma_x(\tau_2) \end{bmatrix}^*$$

$$\gamma(k) = \sum_{n=0}^{N-1}R(n)R(n-k)$$

$$\gamma_x(k) = \sum_{n=0}^{N-1}R(n)x(n-k)$$

In $\gamma_x(k)$, $x(n-k)$ is the discretely sampled cross-correlation that needs to have its multipath noise removed. The matrix equation $A \cdot [u^* v^*]^T = b$ is solved for u and v for many values of $\tau_1$ and $\tau_2$ in the environment-dependent time interval in which the system designer expects to encounter the received signal and the multipath noise, and the solution that minimizes J is chosen. The parameters of the two-ray model then are: $A_1=|u|$, $\phi_1=$phase of u, $A_2=|v|$, $\phi_2=$phase of v. Note that the matrix A depends only on the autocorrelation function R and so can be calculated in advance. The cross-correlation with the echo subtracted is $x(n)-A_2e^{j\phi_2}R(n-\tau_2)$.

It should be noted that firmware and software embodiments of multipath mitigation unit 16 can, in principle, achieve better separation of LOS signals from multipath echoes because the fineness of the sampling of the functions $T_1(n)$ and $T_2(n)$ is not limited, in the firmware and software embodiments, to the sampling frequency of hardware correlators 14.

Peak estimation is performed in delay estimation unit 18 using a parabolic estimation method. It is performed over the modified correlation pattern after the subtraction, if needed, of ECHO from it. The parabolic peak estimation is based on the assumption that the correlation pattern highest values behave as a parabolic function. This is a valid assumption since the correlation is limited in bandwidth. A parabolic function is fitted to the $2T_c/T_s$ samples centered on the maximum of the correlation pattern by one of several algorithms that are known in the art. The delay corresponding to the maximum of the parabola is the estimated delay used in the subsequent navigation calculation in navigation unit 20.

Figure 5:
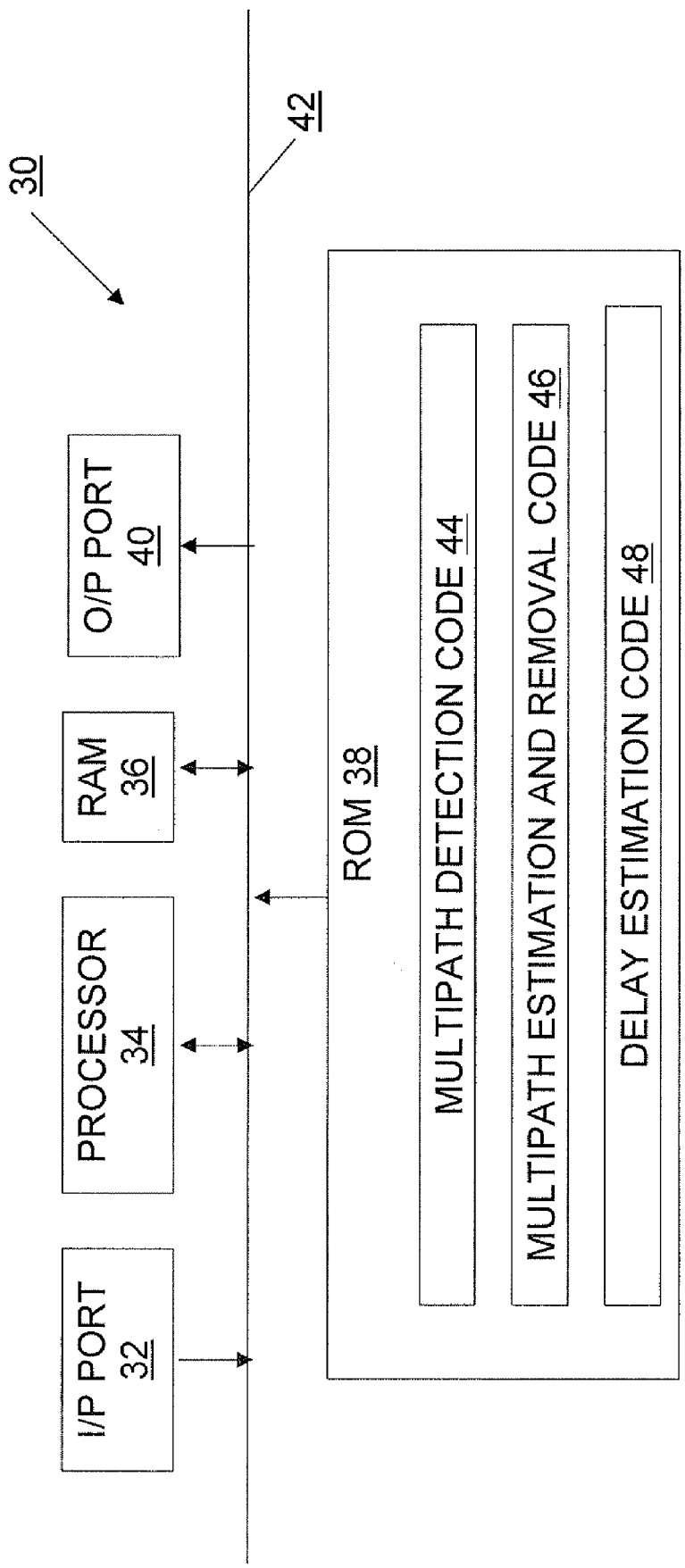
FIG. 5 is a partial high-level block diagram of a combined software implementation of the multipath mitigation and delay estimation units of FIG. 1.

As noted above, components 14, 16, 18 and 20 of FIG. 1 may be implemented in hardware, in firmware, in software or as any combination of the three. FIG. 5 is a high-level partial high-level block diagram of a combined software implementation 30 of multipath mitigation unit 16 and delay estimation unit 18. Only the components of combined unit 30 that are relevant to the present invention are shown in FIG. 5. Combined unit 30 includes an input port 32, a processor 34, a random access memory (RAM) 36, a read-only memory (ROM) 38 and an output port 40, all communicating with each other via a common bus 42. Cross-correlation functions from correlators 14 are received at input port 32. In ROM 38 is stored executable code 44 for determining whether received cross-correlation functions include multipath noise as described above, executable code 46 for estimating and removing the multipath noise as described above, and executable code 48 for estimating the delays of the cross-correlation functions after multipath noise has been removed from the cross-correlation functions as needed, also as described above. Under the control of an operating system (not shown), processor 34 copies the executable code from ROM 38 to RAM 36, executes the code in RAM 36, and exports the resulting estimated delays to navigation unit 20 via output port 40.

ROM 38 is an example of a computer-readable storage medium having embodied thereon computer-readable code for implementing the present invention. Other examples of such computer-readable storage media include compact disks and flash disks.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:
1. A method of determining a location of a receiver, comprising the steps of:
(a) using the receiver, receiving, from each of a plurality of transmitters at known locations, a respective ranging signal; and

(b) for each said ranging signal:
  (i) cross-correlating said each ranging signal with a respective model signal thereby obtaining a respective cross-correlation function,
  (ii) determining whether said respective cross-correlation function includes multipath noise, by steps including: for each said ranging signal:
    (A) generating a template function from said respective cross-correlation function,
    (B) computing a quality measure for said respective cross-correlation function by comparing said template function to said respective cross-correlation function, and
    (C) comparing said quality measure to a predetermined threshold, and
  (iii) if said respective cross-correlation function includes multipath noise:
    (A) estimating said multipath noise, and
    (B) removing said multipath noise from said respective cross-correlation function.

2. The method of claim 1, wherein, for each said ranging signal, said model signal is a respective ranging code of said respective transmitter.

3. The method of claim 1, wherein said template function has a predetermined shape and wherein said template function is generating by fitting said shape to said respective cross-correlation function.

4. The method of claim 3, wherein said shape is triangular.

5. The method of claim 1, wherein said estimating of said multipath noise is a least squares estimating.

6. The method of claim 1, wherein said multipath noise is removed from said respective cross-correlation function by subtracting said multipath noise from said respective cross-correlation function.

7. The method of claim 1, further comprising the step of:
  (c) for each said ranging signal, estimating a respective delay of said respective cross-correlation function.

8. The method of claim 7, wherein, for each said ranging signal, said estimating of said respective delay is effected by steps including fitting a predetermined functional form to said respective cross-correlation function.

9. The method of claim 8, wherein said functional form is parabolic.

10. The method of claim 7, further comprising the step of:
  (d) inferring the location of the receiver from said delays.

11. A device for determining a location at which a plurality of ranging signals are received from a plurality of transmitters at known respective locations, comprising:
  (a) a receiver for receiving the ranging signals;
  (b) at least one cross-correlator for cross-correlating each ranging signal with a respective model signal, thereby obtaining, for each ranging signal, a corresponding cross-correlation function; and
  (c) a multipath mitigation unit for, for each cross-correlation function:
    (i) determining whether said each cross-correlation function includes multipath noise, by steps including: for each said ranging signal:
      (A) generating a template function from said respective cross-correlation function,
      (B) computing a quality measure for said respective cross-correlation function by comparing said template function to said respective cross-correlation function, and
      (C) comparing said quality measure to a predetermined threshold, and
    (ii) if said each cross-correlation function includes multipath noise:
      (A) estimating said multipath noise, and
      (B) removing said multipath noise from said corresponding cross-correlation function.

12. The device of claim 11, further comprising:
  (d) a delay estimation unit for estimating a respective delay of each said cross-correlation function after said multipath noise has been removed from said cross-correlation functions that include said multipath noise.

13. The device of claim 12, further comprising:
  (e) a navigation unit for inferring the location from said delays.

14. A non-transitory computer-readable storage medium having embodied thereon computer-readable code for mitigating multipath noise in a cross-correlation function obtained by cross-correlating a ranging signal with a model signal, the computer-readable code comprising:
  (a) program code for determining whether the cross-correlation function includes multipath noise, by steps including: for each said ranging signal:
    (i) generating a template function from said respective cross-correlation function,
    (ii) computing a quality measure for said respective cross-correlation function by comparing said template function to said respective cross-correlation function, and
    (iii) comparing said quality measure to a predetermined threshold; and
  (b) program code for, if the cross-correlation function includes multipath noise:
    (i) estimating said multipath noise; and
    (ii) removing said multipath noise from the cross-correlation function.

15. A method of determining a location of a receiver, comprising the steps of:
  (a) using the receiver, receiving, from each of a plurality of transmitters at known locations, a respective ranging signal; and
  (b) for each said ranging signal:
    (i) cross-correlating said each ranging signal with a respective model signal thereby obtaining a respective cross-correlation function,
    (ii) explicitly determining whether said respective cross-correlation function includes multipath noise, and
    (iii) only if, according to said determining, said respective cross-correlation function includes multipath noise:
      (A) estimating said multipath noise, and
      (B) removing said multipath noise from said respective cross-correlation function.

16. A device for determining a location at which a plurality of ranging signals are received from a plurality of transmitters at known respective locations, comprising:
  (a) a receiver for receiving the ranging signals;
  (b) at least one cross-correlator for cross-correlating each ranging signal with a respective model signal, thereby obtaining, for each ranging signal, a corresponding cross-correlation function; and
  (c) a multipath mitigation unit for, for each cross-correlation function:
    (i) explicitly determining whether said each cross-correlation function includes multipath noise, and
    (ii) only if, according to said determining, said each cross-correlation function includes multipath noise:
      (A) estimating said multipath noise, and (B) removing said multipath noise from said corresponding cross-correlation function.

17. A non-transitory computer-readable storage medium having embodied thereon computer-readable code for mitigating multipath noise in a cross-correlation function obtained by cross-correlating a ranging signal with a model signal, the computer-readable code comprising:
(a) program code for explicitly determining whether the cross-correlation function includes multipath noise; and
(b) program code for, only if, according to said determining, the cross-correlation function includes multipath noise:
(i) estimating said multipath noise; and
(ii) removing said multipath noise from the cross-correlation function.

\* \* \* \* \*